United States Patent
Todorovic

(10) Patent No.: US 9,915,229 B2
(45) Date of Patent: Mar. 13, 2018

(54) BLEED DUCT ASSEMBLY FOR A GAS TURBINE ENGINE

(71) Applicant: ROLLS-ROYCE DEUTSCHLAND LTD & CO KG, Blankenfelde-Mahlow, Dahlewitz (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 780 days.

(21) Appl. No.: 14/455,531

(22) Filed: Aug. 8, 2014

(65) Prior Publication Data
US 2015/0052908 A1    Feb. 26, 2015

(30) Foreign Application Priority Data
Aug. 21, 2013   (GB) .................................. 1314946.3

(51) Int. Cl.
*F02K 3/02*   (2006.01)
*F01D 25/16*  (2006.01)
(Continued)

(52) U.S. Cl.
CPC .............. *F02K 3/02* (2013.01); *F01D 25/162* (2013.01); *F02C 6/08* (2013.01); *F02C 9/18* (2013.01); *F02K 3/075* (2013.01); *F05D 2210/30* (2013.01); *F05D 2240/12* (2013.01); *F05D 2250/38* (2013.01); *F05D 2250/75* (2013.01)

(58) Field of Classification Search
CPC . F02D 3/02; F02D 3/025; F02D 3/075; F02D 3/06; F01D 25/162; F02C 6/08; F02C 9/18; F02K 3/02
See application file for complete search history.

(56) References Cited

U.S. PATENT DOCUMENTS 4,791,783 A * 12/1988 Neitzel ................. F01D 17/162
60/226.3
5,231,825 A * 8/1993 Baughman .......... F04D 27/0215
60/204

(Continued)

FOREIGN PATENT DOCUMENTS

EP    2 495 425 A2    9/2012
EP    2 497 908 A2    9/2012

(Continued)

OTHER PUBLICATIONS

Dec. 23, 2014 Extended Search Report issued in European Application No. 14180291.8.

(Continued)

*Primary Examiner* — Craig Kim
(74) *Attorney, Agent, or Firm* — Oliff PLC

(57) ABSTRACT

A bypass duct has a support unit comprising a pair of aerofoils arranged as an "A" frame. A bleed duct assembly is provided on the radially inner wall of the bypass duct annulus and the aerofoils project from the surface and extend across the annulus between the inner wall and an outer wall of the annulus. The aerofoils lean at an acute angle to the surface with the first flank facing toward the inner wall and adjoining a bleed duct opening. The bleed duct having a bleed duct passage and a submerged scoop.

12 Claims, 12 Drawing Sheets

(51) Int. Cl.
*F02K 3/075* (2006.01)
*F02C 9/18* (2006.01)
*F02C 6/08* (2006.01)

(56) References Cited

U.S. PATENT DOCUMENTS

| | | | |
|---|---|---|---|
| 5,279,109 A * | 1/1994 | Liu | F02C 7/052 |
| | | | 60/39.092 |
| 5,740,674 A * | 4/1998 | Beutin | F01D 9/042 |
| | | | 415/142 |
| 9,623,354 B2 * | 4/2017 | Kumar | B01D 45/08 |
| 2008/0010970 A1 * | 1/2008 | Eleftheriou | F01D 25/162 |
| | | | 60/226.1 |
| 2012/0222396 A1 | 9/2012 | Clemen | |
| 2013/0276453 A1 * | 10/2013 | Rosenau | F01D 9/04 |
| | | | 60/785 |

FOREIGN PATENT DOCUMENTS

| | | |
|---|---|---|
| GB | 2 110 762 A | 6/1983 |
| WO | 2005/012696 A1 | 2/2005 |

OTHER PUBLICATIONS

Search Report issued in British Application No. 1314946.3 dated Mar. 11, 2014.

* cited by examiner

BLEED DUCT ASSEMBLY FOR A GAS TURBINE ENGINE

TECHNICAL FIELD OF INVENTION

The present invention relates to bleed ducts in a gas turbine engine and in particular bleed ducts adjoining an aerofoil extending across a bypass duct of the engine

BACKGROUND OF INVENTION

Modern gas turbines are provided with an engine core comprising a compressor, combustor and turbine section and a surrounding annular bypass duct through which an air flow is guided by a fan. The bypass duct is limited by a radially inner wall and by a radially outer wall. Between the inner wall and the outer wall of the bypass duct, a support unit is provided that includes strut-like support elements connected at one end to the inner wall and at the other end to the outer wall.

FIG. 1 depicts a ducted fan gas turbine engine generally indicated at 10 which comprises, in axial flow series, an air intake 1, a propulsive fan 12, an intermediate pressure compressor 7, a high pressure compressor 9, combustion equipment 115, a high pressure turbine 116, an intermediate pressure turbine 117, a low pressure turbine 118 and an exhaust nozzle 119.

Air entering the air intake 8 is accelerated by the fan 12 to produce two air flows, a first air flow 11 into the intermediate pressure compressor 7 and a second air flow 10 that passes over the outer surface of the engine casing 12 and through a bypass duct 2 which provides propulsive thrust. The intermediate pressure compressor 7 compresses the air flow directed into it before delivering the air to the high pressure compressor 9 where further compression takes place.

Compressed air exhausted from the high pressure compressor 9 is directed into the combustion equipment 115, where it is mixed with fuel that is injected from a fuel injector and the mixture combusted. The resultant hot combustion products expand through and thereby drive the high 116, intermediate 117 and low pressure 118 turbines before being exhausted through the nozzle 119 to provide additional propulsive thrust. The high, intermediate and low pressure turbines respectively drive the high and intermediate pressure compressors and the fan by suitable interconnecting shafts.

In the bypass duct 2, several fan outlet guide vanes 13 are arranged downstream of the fan 9 which reduce or remove a twist in the flow of the bypass flow 10. In addition, supports 14a or 14b are provided downstream of the fan outlet guide vanes 13, bracing the inner wall 3 and the outer wall 4 against one another. In addition to the supports 14, the engine can have further support structures called bifurcations 15 through which lines are routed for supplying the jet engine device 1 or an airframe of an aircraft provided with the jet engine device 1. The position of the support 14a is the position typically used within large or medium civil gas turbines. The position of the support 14b is that typically used in smaller, business jet type applications. The general structure and form of the supports is the same for each and will be discussed in common as reference 14 in the rest of the specification.

Depending on the specific application, it is also possible for the bifurcations 15 to be arranged in the same cross-sectional plane as the supports 14.

The support unit 14 includes strut-like aerofoil support elements 17 to 20 shown in more detail in FIG. 2 and connected at one end to the inner wall 3 and at the other end to the outer wall 4. The aerofoils 17 to 20 of each support element each describe an acute angle 17E, 18E, 19E and 20E between the circumferentially outward facing flanks 17C, 18C, 19C and 20C and the radially outer wall of the bypass duct 4. The aerofoils 17 to 20 of each support element also each describe an acute angle 17F, 18F, 19F and 20F between the circumferentially inward facing flanks 17D, 18D, 19D and 20D and the radially inner wall of the bypass duct 3.

Each support unit comprises two aerofoils 17 and 18 or 19 and 20, respectively that are connected in a manner forming an A-arrangement to the inner wall 3 and to the outer wall 4 in the manner shown in more detail in FIG. 2 and form so-called A-frames of the support unit 14. The "A" tapering as the support unit progresses radially outwards. The facing flanks of each aerofoil pair describing an acute angle with the radially inner wall of the bypass duct.

The aerofoils 17 and 18 or 19 and 20, respectively, representing A-frames level in the bypass duct 2 with a duct height H in order to transmit engine loads acting in the area of the engine core 12 outwards in the direction of the outer wall 4. The aerofoils 17 and 18 or 19 and 20, respectively, assigned to one another in pairs form the support units and are, depending on the specific application, arranged relative to one another at a defined acute angle 17F, 18F or 19F, 20F, respectively, and at a distance D defined in the circumferential direction.

The acute angle of the aerofoil flanks to the radially inner and outer walls causes an increase in the velocity of the air which subsequently interacts with the main flow boundary layer and causes wakes to form which add to the pressure loss through the bypass duct and can take energy from the bulk flow. The lost energy reduces the overall efficiency of the gas turbine engine and reduces the engine performance.

In many conventional engines an offtake is provided in the by-pass duct to supply cool air for proper functioning of the engine and its units. The offtakes are separated from the aerofoils and also generate wakes as shown in FIG. 3 and therefore also generate further pressure loss in the by-pass duct.

FIG. 4 depicts the static pressure of the bypass flow 10 for the arrangement of FIG. 3. The bulk pressure has a region 30 where the pressure is relatively constant. At the leading edge of the support unit there are regions of lower static pressure 32 and similar regions of lower static pressure 34, 36 can be seen at boundary layers of the radially inner wall 3 and the radially outer wall 4 respectively.

The regions of lowest static pressure 38, 40 are found where the aerofoils of the A frame form an acute angle with the radially inner 3 and the radially outer 4 wall of the bypass duct. These regions can be significant and can cause significant wakes to form that reduce the efficiency of the gas turbine engine. The wakes are formed in part by the acute angle that the aerofoil forms to the duct wall and which causes an increase in the velocity of the air that goes on to interact with the main flow boundary layer. The wakes generate an area of increased loss in the by-pass duct flow and a reduction in engine performance.

It is an object of the present invention to seek to provide an arrangement having an improved efficiency.

STATEMENTS OF INVENTION

According to the present invention there is provided a bleed duct assembly for a gas turbine bypass duct comprising a circumferentially extending surface defining an inner wall of an annulus onto which a bleed duct opens at a bleed duct opening and an aerofoil projecting from the surface and extending across the annulus between the inner wall and an outer wall of the annulus, the aerofoil having a leading edge, a trailing edge and first and second flanks connecting the leading edge and the trailing edge, wherein the aerofoil is leant at an acute angle to the surface with the first flank facing toward the inner wall and adjoining the bleed duct opening.

Advantageously, the invention allows generated wakes from the bleed duct and the aerofoils to be combined such that the resulting wake of the combined features has smaller pressure drop than the sum of the wakes of the separate features.

Advantageously, the lean of the aerofoil can assist in directing the flow radially inwards towards the duct opening. This turning of the flow increases the flow through the opening and allows a smaller opening to be used to generate a desired duct flow than the opening required to generate the same flow if the duct opening is positioned away from the aerofoil flank.

Preferably the aerofoil provides an axially extending edge to the bleed duct.

The bleed duct opening may have a leading edge at a first axial location and a trailing edge at a second axial location axially rearward of the first axial location The first axial location is preferably at or before the axial location of the leading edge of the aerofoil.

The second axial location is preferably rearward of the axial location of the leading edge of the aerofoil and at or aft of the axial location of the trailing edge of the aerofoil.

The second axial location may be rearward of the axial location of the trailing edge of the aerofoil.

The leading edge of the bleed duct opening and the trailing edge of the bleed duct opening may extend substantially circumferentially, wherein the circumferential length of the leading edge is less than the circumferential length of the trailing edge.

The leading edge of the bleed duct opening may be angled such that it is orthogonal to the boundary layer flow direction.

The bleed duct may have a bleed duct passage and a scoop recessed radially inside the inner wall.

The recessed scoop preferably has a side wall, the first flank projecting radially inside the surface and providing at least part of the scoop side wall.

According to a second aspect of the invention there is provided a support unit for a gas turbine engine, the support unit having a pair of aerofoils with a first aerofoil having the aerofoil having a leading edge, a trailing edge and first and second flanks connecting the leading edge and the trailing edge, the aerofoil leaning at an acute angle to the surface with the first flank facing toward the inner wall and a second aerofoil having a leading edge, a trailing edge and first and second flanks connecting the leading edge and the trailing edge, the aerofoil leaning at an acute angle to the surface with the first flank facing toward the inner wall, wherein the first flank of the first aerofoil and the first flank of the second aerofoil face towards each other; characterised in that the first aerofoil is the aerofoil in a bleed duct assembly according to any of the preceding 12 paragraphs.

The second aerofoil may also be the aerofoil in a bleed duct assembly according to any of the preceding claims. There may be a duct opening for each of the aerofoils in the support unit According to a third aspect of the invention there is provided a gas turbine engine having a support unit according to the preceding two paragraphs.

DETAILED DESCRIPTION OF INVENTION

Figure 5:
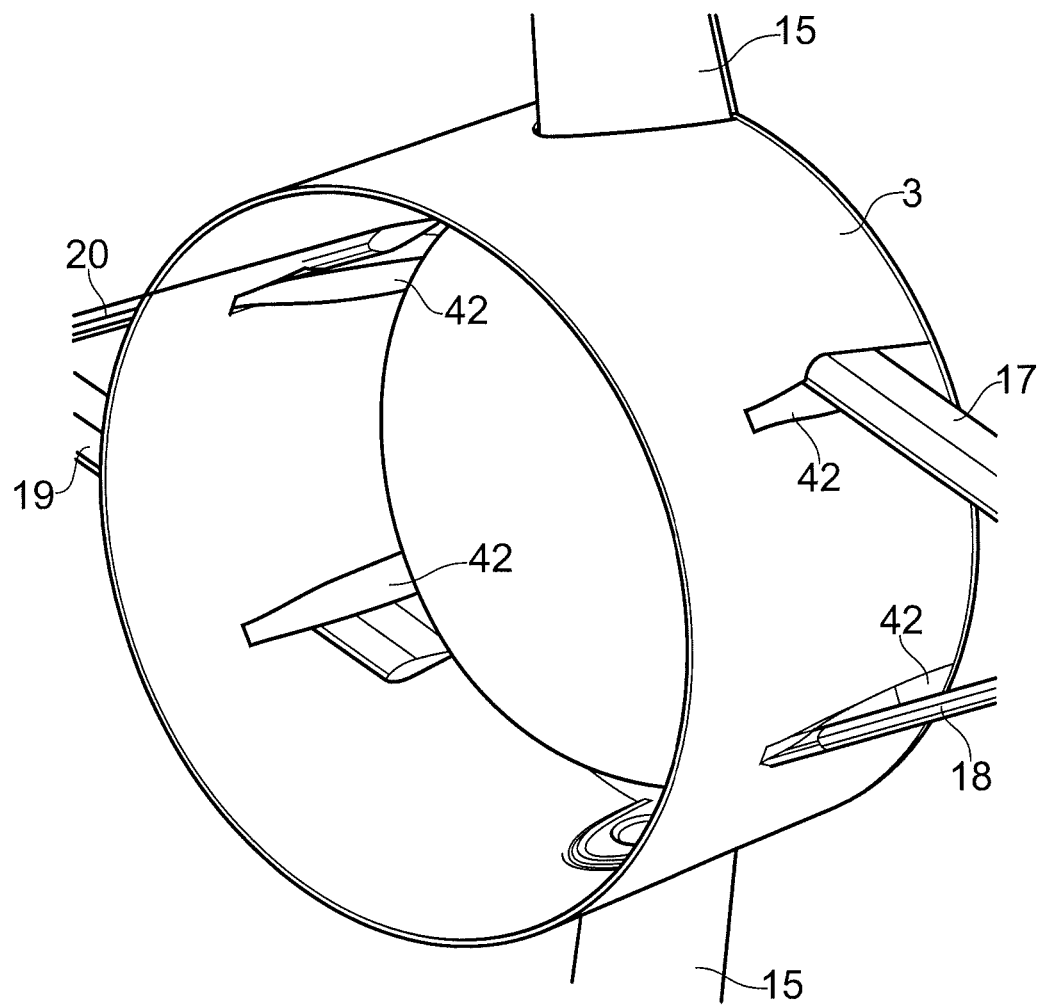
FIG. 5 depicts a perspective view of the "A-frames" arrangement in accordance with the invention.
Figure 6:
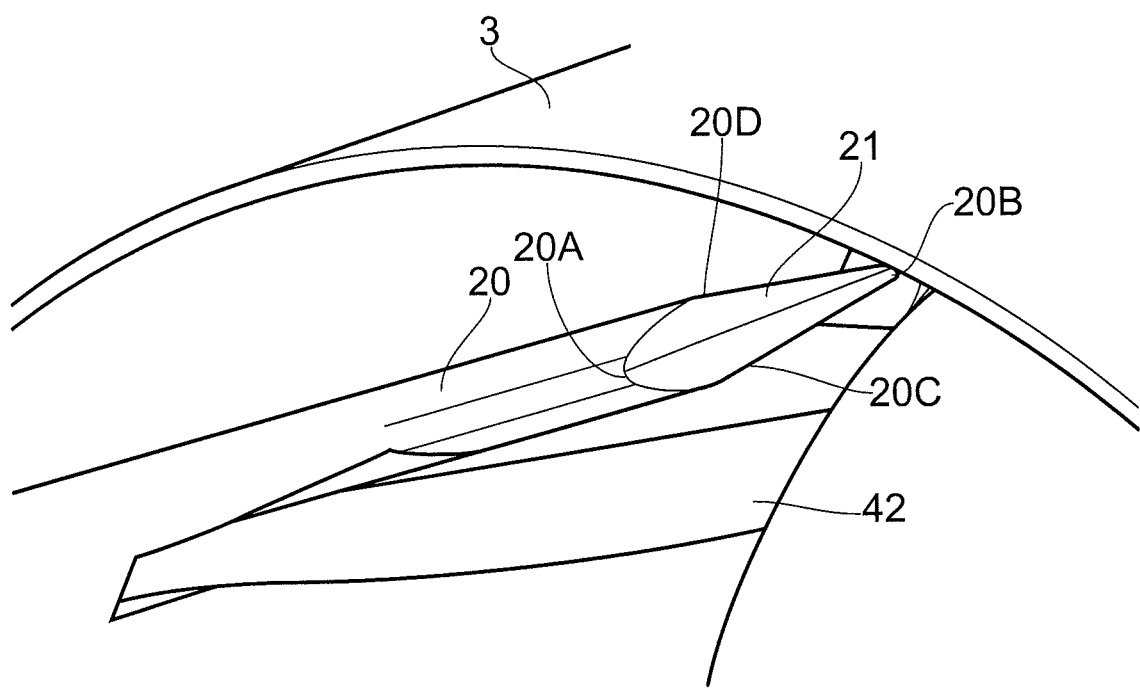
FIG. 6 depicts an enlarged view of the cross-section through aerofoil 20 of FIG. 3.

A perspective view of the "A frames" is shown in FIG. 5. The aerofoils 17, 18 and 19, 20 making up the frames extend through the inner wall 3 of the bypass duct and extend radially across the duct. A bifurcation 15 is also shown. Each aerofoil 17 to 20 is designed with aerodynamically shaped cross-sectional profiles which when radially stacked one above the other determine the shape of the A-frame or support unit 14. The aerofoils 17 to 20 of the support unit 14 here have no curvature relative to the engine axis 6 and are designed relative to a central longitudinal plane 21 with a thickness distribution forming a desired profile e.g. an elliptical and hence aerodynamically optimized cross-sectional profile in a cross-sectional plane 22 perpendicular to the central longitudinal plane 21. An exemplary cross-section is shown in FIG. 6 which is an enlarged view of the end of the aerofoil 20 in FIG. 3.

Figure 7:
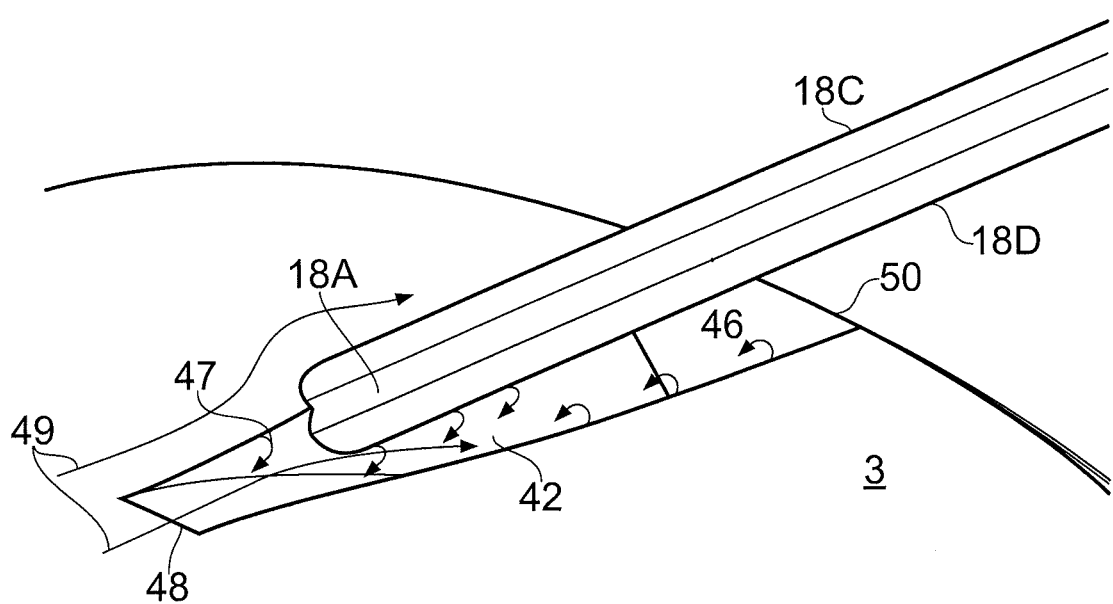
FIG. 7 shows a schematic perspective view of a bleed duct arranged relative to an aerofoil assembly.
Figure 8:
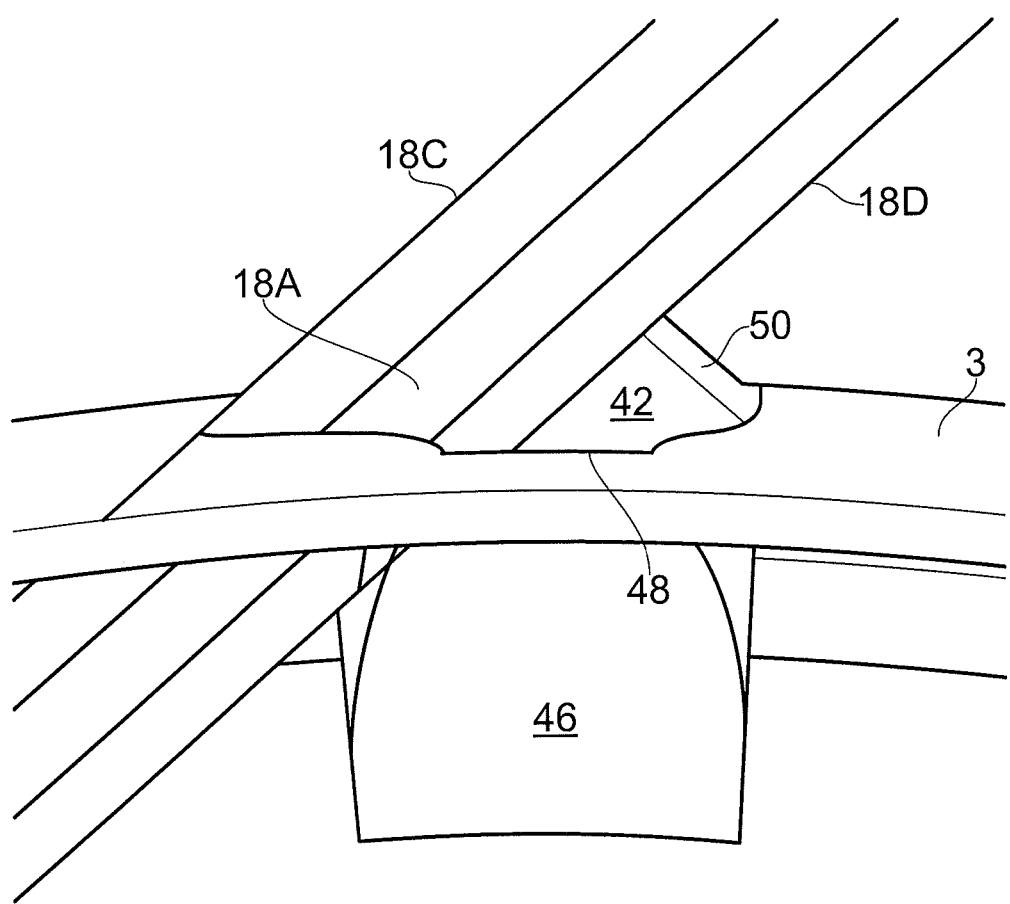
FIG. 8 depicts a rearward looking view of the bleed duct/aerofoil of FIG. 6.
Figure 9:
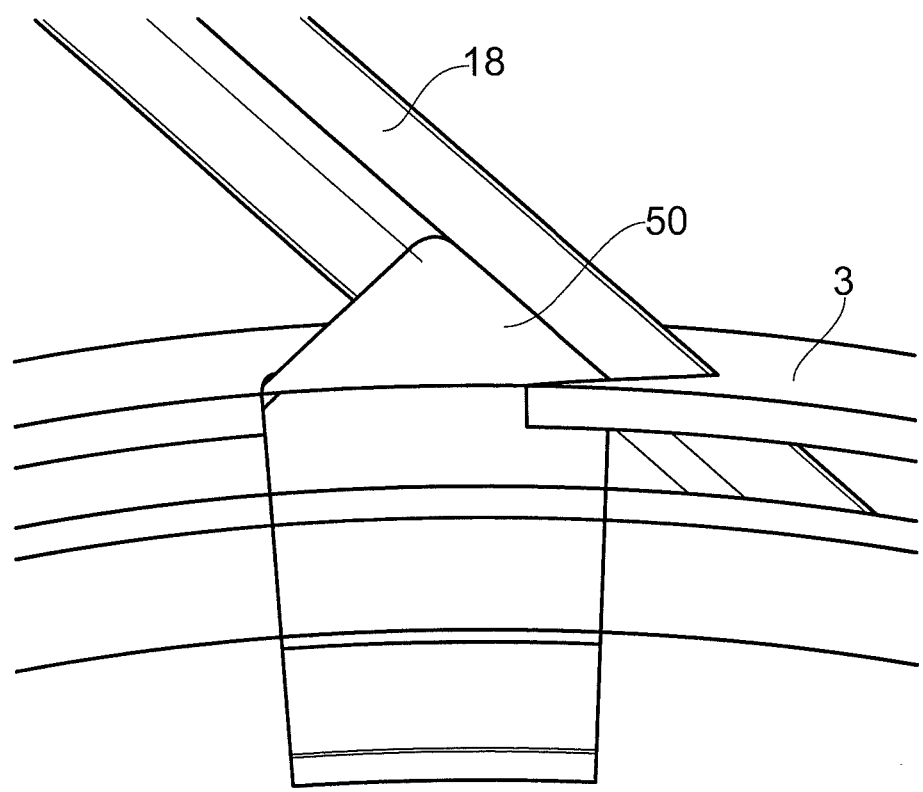
FIG. 9 depicts a forward looking view of the bleed duct/aerofoil of FIG. 6.

To address the problems with the regions of low pressure and wake generation a bleed duct 42 is located adjacent to the aerofoil flank 18D which forms the acute angle with the radially inner wall 3 of the bypass duct. As depicted in FIG. 7, which is a schematic perspective view, and FIG. 8, which is a view looking rearwardly along the a line parallel to the axis of the engine, and FIG. 9, which is a view looking forward along a line parallel to the axis of the engine the duct is preferably of the submerged inlet type having an opening 42 that is flush with the surface 3 and which feeds a duct passage 44 via a scoop 46.

The opening and scoop is of the NACA type which allows air flow into the duct passage 44 with a minimal disturbance to the main flow 10. The scoop consists of a shallow ramp with walls that are recessed below the radially inner wall 3. The opening and scoop both flare from a relatively narrow upstream edge to a wider downstream edge. The side edges of the opening and scoop have a curved profile to minimise detrimental vortices being shed therefrom.

The combination of the shallow ramp angle and the side walls create counter rotating vortices 47 which deflect the boundary layer away from the inlet to draw in the faster moving are whilst avoiding the drag and flow separation that can occur with protruding scoop designs.

The scoop leading edge 48 is preferably located axially upstream of the leading edge 18a of the aerofoil 18 whilst the trailing edge of the scoop is positioned axially rearward of the trailing edge 18b of the aerofoil. Circumferentially in the engine it is desirable for the scoop leading edge 48 to be positioned in line with the leading edge of the aerofoil, or slightly circumferentially offset from the leading edge and curved such that the flank of the aerofoil forms one of the side edges of the scoop.

Figure 10:
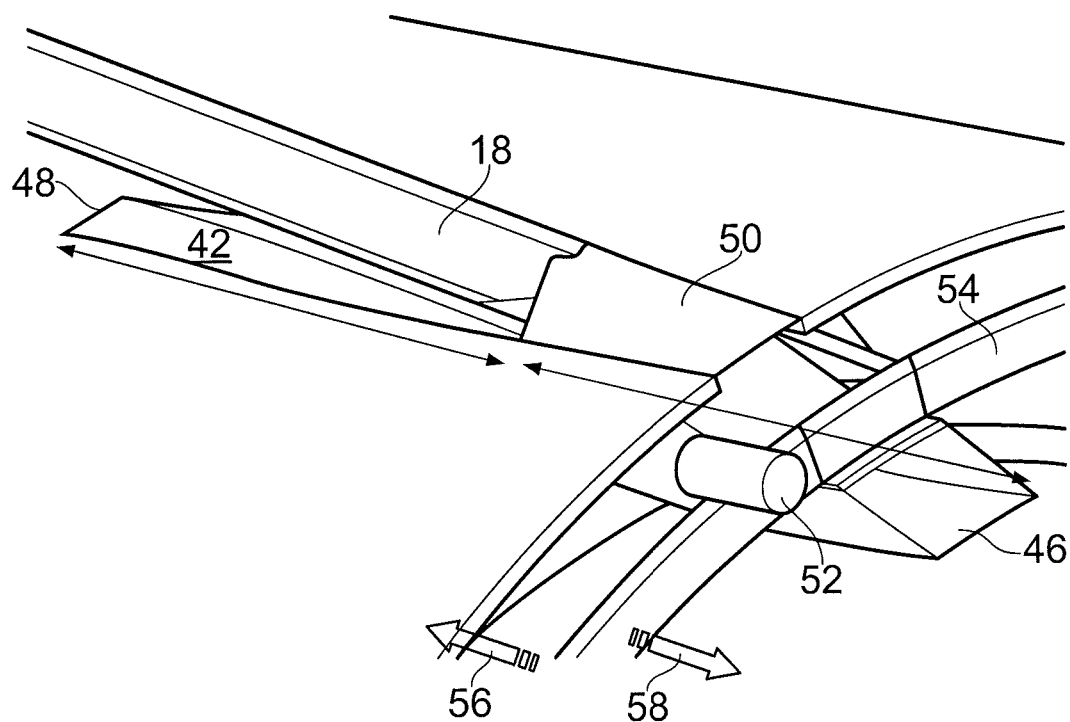
FIG. 10 shows a schematic forward looking perspective view of the bleed duct/aerofoil of FIG. 7.

The streamline flow is depicted as lines 49 and is directed around the aerofoil. The aerofoil angle 17F, 18F, 19F, 20F can assist in directing the flow radially inwards towards the opening and the scoop. This turning of the flow increases the flow into the scoop and allows a smaller opening to be used to generate a desired duct flow than the opening required to generate the same flow if the duct is positioned away from the aerofoil flank. At the rearmost edge of the scoop a raised lip 50 is blended with the trailing edge of the aerofoil and the surface 3 to provide an aerodynamic surface which helps to scoop the turned air from the "A frame" aerofoil 18 into the duct 46. The raised lip slopes radially inwardly from the trailing edge of the respective aerofoil towards surface 3 as it extends circumferentially across the scoop 42. The lip may also extend axially either from a forward location at the trailing edge of the aerofoil to the surface or from the surface to a rearward location at the trailing edge. FIG. 10 is a perspective view looking axially forward towards the front of the engine of the scoop arrangement of FIGS. 7 to 9.

Figure 11:
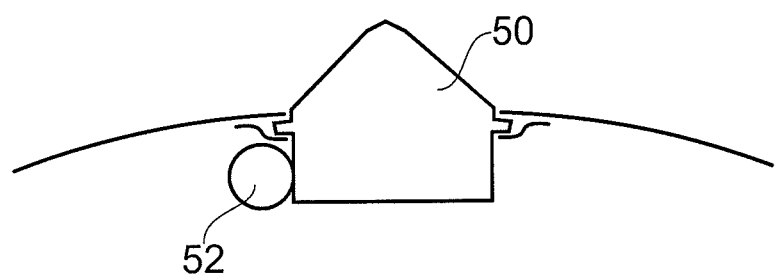
FIG. 11 shows a simplified rear view of the arrangement of FIG. 10 that depicts the location of an actuator to the bleed duct.

FIG. 10 also shows the position of an electric valve actuator 52 that can be used to control the amount of air flowing through the bleed duct preferably by sliding the raised lip 50 fore and aft. Advantageously, the actuator is located within in a cold environment exemplified by arrow 56 in the engine and separated from a hot environment exemplified by arrow 58 by a fire-shield 54. The actuator is preferably located circumferentially adjacent to the bleed duct passage 46 as shown in FIG. 11.

Figure 12:
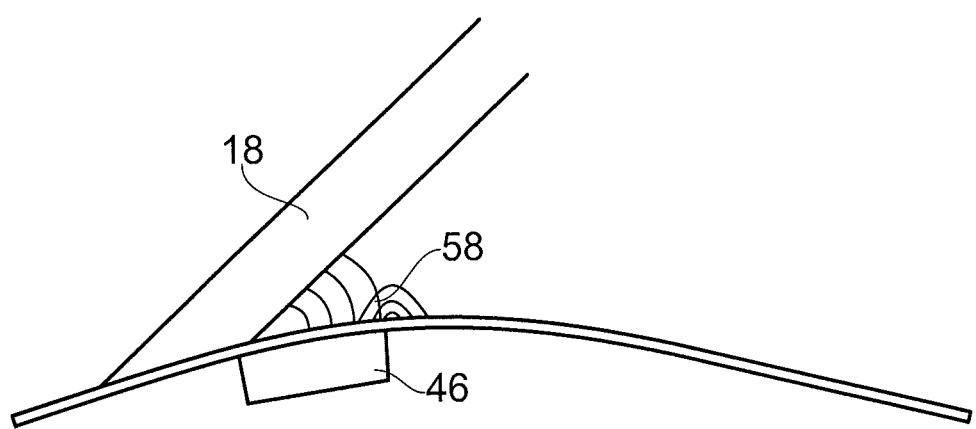
FIG. 12 shows the combined wakes of the aerofoils and associated bleed duct.

One of the advantages of locating the bleed duct adjacent to the aerofoil is shown in FIG. 12 as the wakes generated by the aerofoil and wakes generated by the bleed duct are combined into a single wake group 58 such that their combined value is less than the sum of their individual values.

Figure 1:
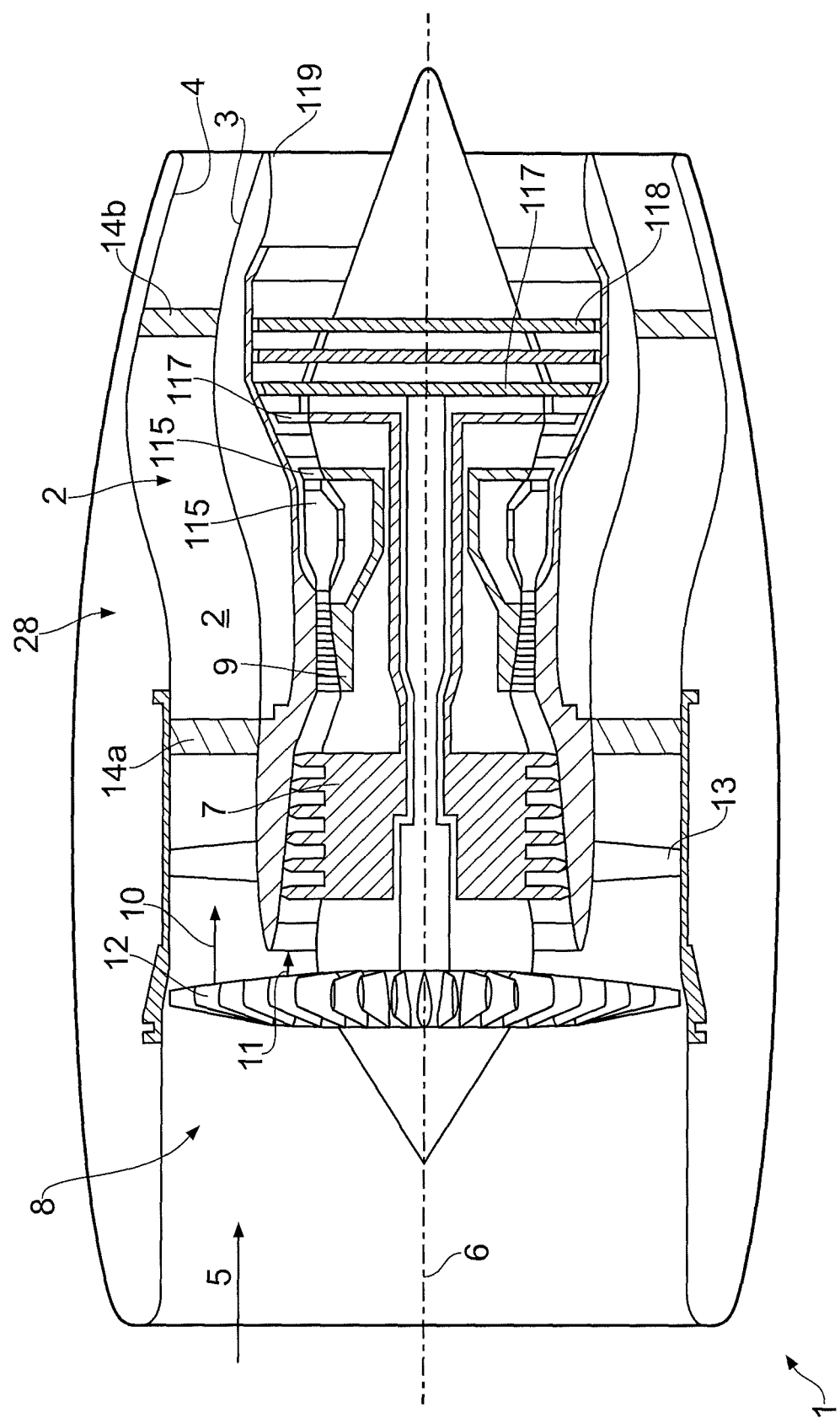
FIG. 1 depicts a conventional ducted fan gas turbine engine.
Figure 2:
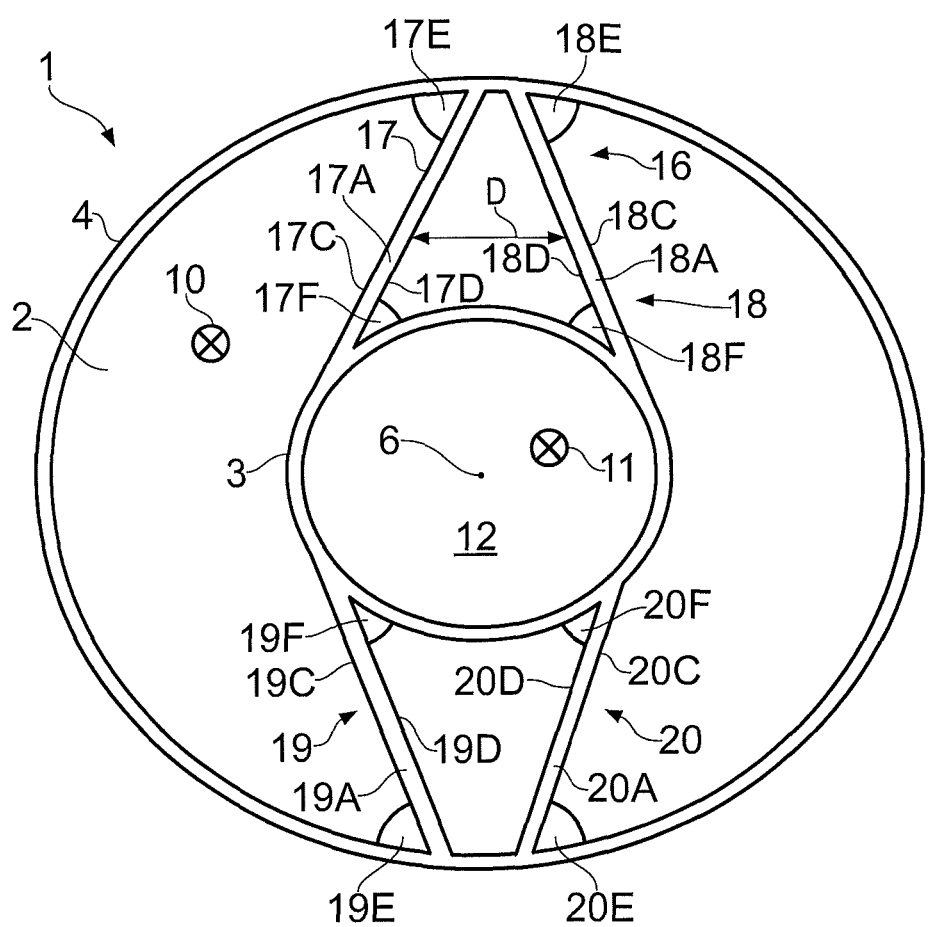
FIG. 2 depicts another view of a conventional ducted fan gas turbine engine.
Figure 3:
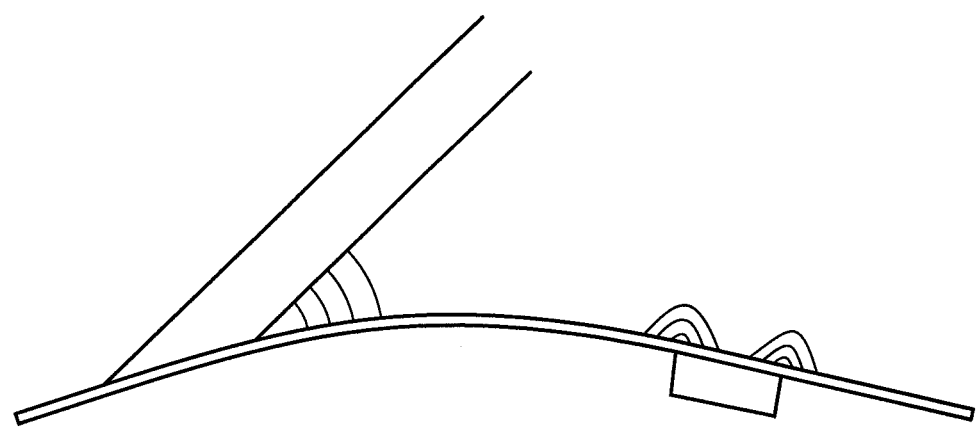
FIG. 3 depicts wakes generated when offtakes are separated from the aerofoils.
Figure 4:
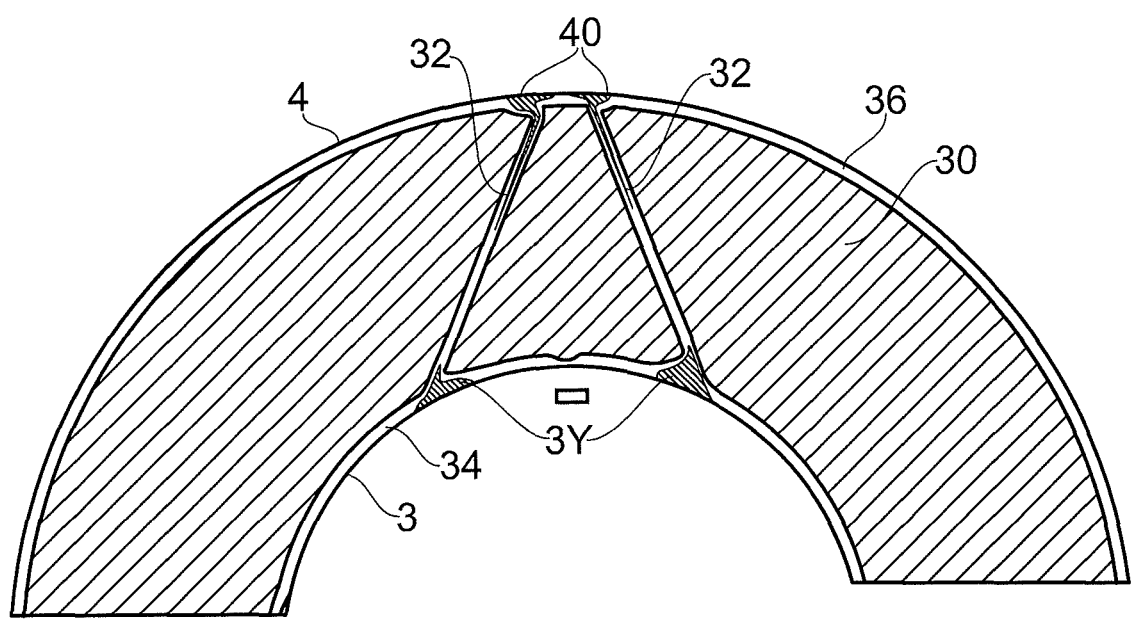
FIG. 4 depicts the static pressure of the bypass flow for the arrangement of FIG. 3.
Figure 13:
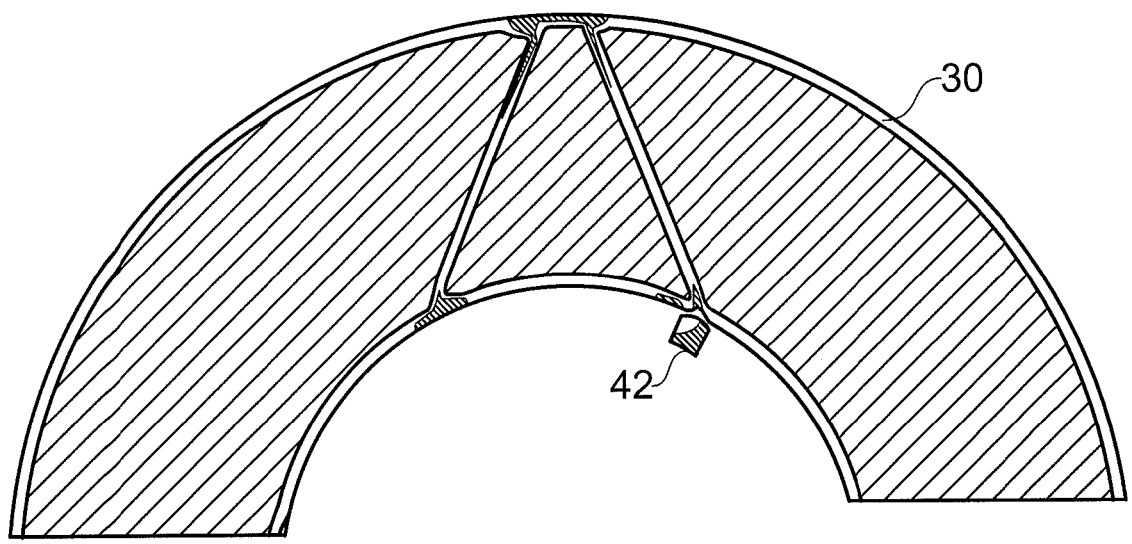
FIG. 13 shows the pressure distribution in the bypass duct along adjoining the aerofoil having a bleed duct in accordance with the invention.

As shown in FIG. 13, which is equivalent to FIG. 3, the static pressure of the bypass flow 10 along cross-section II-II of FIG. 1 is shown with a scoop 42 located adjacent the A frame aerofoil. The bulk pressure has a region 30 where the pressure is relatively constant. As can be noted, the region of lowest static pressure which were found where the aerofoils of the A frame form an acute angle with the radially inner wall 3 of the bypass duct has been significantly removed by locating the scoop opening adjacent the aerofoil flank. Advantageously, wake generation is reduced giving rise to an overall improvement in the efficiency of the gas turbine engine.

It will be appreciated that modifications may be made without departing from the invention described herein. For example the axial location of the leading edge of the scoop may be moved in-line or aft of the leading edge of the aerofoil.

Scoops may be provided for one or more of the aerofoils in the support units adjacent to the flank forming the acute angle with the surface having the duct opening.

The air within the duct passage may be utilised for a cooling flow within the combustor or turbine section of the engine or to cool auxiliary components within the inner core fairing.

The invention claimed is:

1. A bleed duct assembly for a gas turbine bypass duct comprising:
a circumferentially extending surface defining an inner wall of an annulus onto which a bleed duct opens at a bleed duct opening and an aerofoil projecting from the circumferentially extending surface and extending across the annulus between the inner wall and an outer wall of the annulus, the aerofoil having a leading edge, a trailing edge and first and second flanks connecting the leading edge and the trailing edge,
wherein the aerofoil is leant at an acute angle to the circumferentially extending surface with the first flank facing toward the inner wall and adjoining the bleed duct opening.

2. The bleed duct assembly according to claim 1, wherein the aerofoil provides an axially extending edge to the bleed duct.

3. The bleed duct assembly according to claim 1, wherein the bleed duct opening has a leading edge at a first axial location and a trailing edge at a second axial location axially rearward of the first axial location.

4. The bleed duct assembly according to claim 3, wherein the first axial location is at or before the axial location of the leading edge of the aerofoil.

5. The bleed duct assembly according to claim 3, wherein the second axial location is rearward of the axial location of the leading edge of the aerofoil and ahead of the axial location of the trailing edge of the aerofoil.

6. The bleed duct assembly according to claim 3, wherein the second axial location is at or aft of the axial location of the trailing edge of the aerofoil.

7. The bleed duct assembly according to claim 3 wherein the leading edge of the bleed duct opening and the trailing edge of the bleed duct opening extend substantially circumferentially, wherein the circumferential length of the leading edge is less than the circumferential length of the trailing edge.

8. The bleed duct assembly according to claim 1, wherein the bleed duct has a bleed duct passage and a scoop recessed radially inside the inner wall.

9. The bleed duct assembly according to claim 7, wherein the recessed scoop has a side wall, the first flank projecting radially inside the circumferentially extending surface and providing at least part of the scoop side wall.

10. A support unit for a gas turbine engine, the support unit having a pair of aerofoils with a first aerofoil having a leading edge, a trailing edge and first and second flanks connecting the leading edge and the trailing edge, the first aerofoil leaning at an acute angle to a circumferentially extending surface defining an inner wall of an annulus onto which a bleed duct opens at a bleed duct opening and wherein the first flank faces toward the circumferentially extending surface; and the second aerofoil having a leading edge, a trailing edge and first and second flanks connecting the leading edge and the trailing edge, the aerofoil leaning at an acute angle to the circumferentially extending surface with the first flank facing toward the circumferentially extending surface, wherein the first flank of the first aerofoil and the first flank of the second aerofoil face towards each other;

wherein the first flank of the first aerofoil adjoins the bleed duct opening.

11. The support unit for a gas turbine engine according to claim 10, wherein the aerofoils extend across an annular bypass duct surrounding an engine core.

12. A gas turbine engine having the support unit according to claim 11.

* * * * *